United States Patent [19]

O'Neill

[11] 4,416,484

[45] Nov. 22, 1983

[54] FLAT BED SIDE ASSEMBLY

[75] Inventor: David O'Neill, Billings, Mont.

[73] Assignee: Richard P. O'Neill, Miles City, Mont. ; a part interest

[21] Appl. No.: 359,264

[22] Filed: Mar. 18, 1982

[51] Int. Cl.³ .............................................. B60P 1/64
[52] U.S. Cl. ..................................... 296/43; 296/36; 52/489; 105/380
[58] Field of Search ......................... 296/36, 43, 3, 10; 280/143, 148; 105/378, 380, 386, 389; 52/243, 489

[56] References Cited

U.S. PATENT DOCUMENTS

| 674,099 | 5/1901 | Schluter | 296/36 |
| 1,500,092 | 7/1924 | Dietz | 296/43 |
| 3,788,684 | 1/1974 | Johnson et al. | 296/43 |

Primary Examiner—Robert R. Song
Assistant Examiner—Dennis Pedder
Attorney, Agent, or Firm—Arthur L. Urban

[57] ABSTRACT

A flat bed side assembly including a barrier portion, a socket portion, a support portion and a holder portion; the barrier portion including a plurality of generally rectangular panels disposed generally vertically in an end to end relationship around the periphery of a flat bed; the socket portion including a plurality of pocket sections arranged around the periphery of the flat bed adjacent the lower edges of the panels, each of the pocket sections extending downwardly from a plane through the flat bed; the support portion including a plurality of elongated bar members having cross-sectional configurations substantially the same as those of the pocket sections, each bar member having its lower end disposed within one pocket section, the bar members extending upwardly from the pocket sections generally vertically; the holder portion including a plurality of bracket members with at least one bracket member engaging each of the bar members, each bracket member including a plate section, a strip section having its ends affixed to the plate section and being bent into a configuration to provide an opening having substantially the same cross-sectional configuration as that of the bar members for separable engagement therewith, a hook member extending from one end of the plate section, the hook member including a connector section extending substantially perpendicularly from a transverse edge of the plate section a distance substantially equal to the thickness of a barrier panel, a projecting section extending from an edge of the connector section remote from the plate section in the same direction as the plate section and substantially parallel thereto.

11 Claims, 8 Drawing Figures

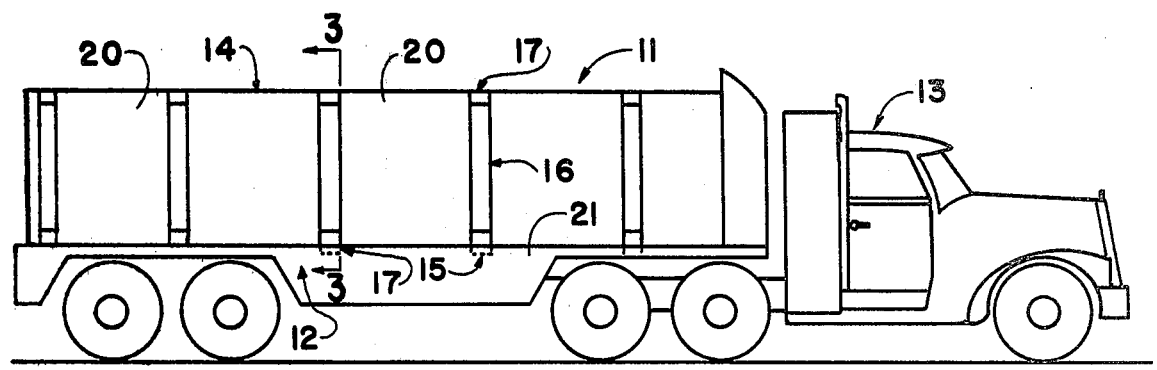
FIG. 1
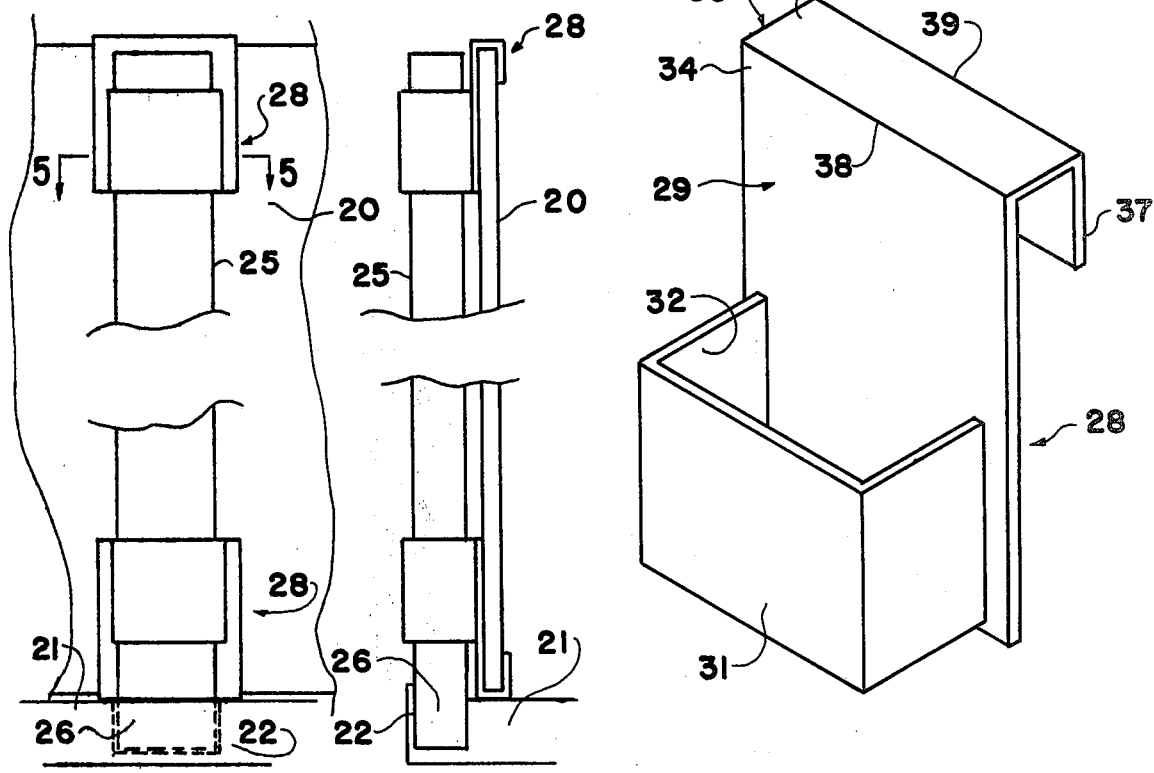
FIG. 2   FIG. 3   FIG. 4
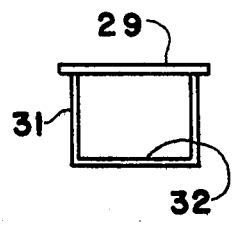
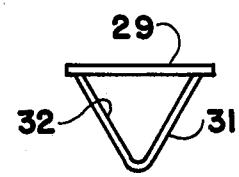
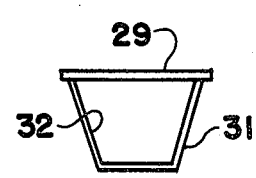
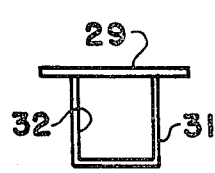
FIG. 5   FIG. 6   FIG. 7   FIG. 8

FLAT BED SIDE ASSEMBLY

This invention relates to a novel side assembly and more particularly relates to a new side assembly for flat bed vehicles such as trucks and trailers.

Through the years, people have hauled many different loads in wagons and more recently in trucks and trailers. To prevent damage or loss of the load, it generally is necessary to secure it on the truck in some way. With trucks that have sidewalls as an integral part of the body, the sidewalls assist in keeping the load on the truck. To hold the load in a specific position on the truck, it may be secured in place with tie down ropes or cables.

Some trucks and trailers are used to haul a variety of different items. For example, grain, coal, wood, steel, containers and the like may be hauled at different times in the same truck. One truck that has become quite popular for hauling of a variety of items is the flat bed truck or trailer. These vehicles have a flat bed extending behind the truck cab. The flat bed facilitates loading of items since there are no sidewalls to interfere with the movement of items onto the truck. This is especially important with large items such as machinery, steel, wood, boxes and the like. To keep these items in place on the flat bed, tie down ropes, cables etc. are used.

Problems arise, however, when a flat bed truck or trailer is to be used to haul small items and particularly granular materials such as grain, coal and the like. These particulate materials cannot be held in place with tie down ropes unless the materials are first boxed or otherwise confined. However, this involves extra time and expense.

These extra expenditrues can be avoided by carrying such particulate material in bulk, that is, all of the material is confined a single enclosure encompassing the entire truck or trailer flat bed. While bulk carriers with permanent sidewalls are available, they do not ahve the adaptability of flat bed vehicles.

To haul particulate materials in flat bed vehicles, it is necessary to provide some type of sidewall assembly. While this can be accomplished readily with sidewalls that are attached permanently to the flat bed, achieving the same hauling capability with temporary sidewall assemblies is much more difficult. Some flat bed vehicles are fitted with stake bodies. Such sidewall assemblies generally include preformed fence-like sections with posts that are inserted into pockets located around the periphery of the flat bed. If the openings in the fence sections are too large, it is necessary to utilize some type of barrier panel.

While such structures perform satisfactorily where the sidewall assembly is changed only occasionally, problems arise in situations in which a flat bed truck or trailer is used for many different types of loads on a frequently changing basis. A flat bed truck may be loaded with an item for delivery to the first destination at which it is loaded with an entirely different item for delivery to a second destination, and then loaded with a third item for delivery back at its home base.

Each item may require a different type of loading. For example, the first and third loads may simply be tied down on the flat bed, whereas the second load may require a full sidewall assembly. For a truck to handle such a sequence of loads would ordinarily require that the sidewall materials be carried on the first leg of the trip, the sidewalls erected after delivery of the first load, the second items transported to the second destination, unloaded, the sidewall assembly dismantled and carried along with the third load for the final delivery.

Such a loading sequence requires that the driver and/or workmen erect and dismantle the sidewall assembly quickly so that delivery of the loads is not delayed. Since the time spent erecting and dismantling the sidewall assembly is nonproductive, it may have to be absorbed by the shipper.

In an attempt to produce a satisfactory sidewall assembly, some drivers carry a supply of posts and plywood to form the sidewall assembly. One of the problems in constructing a tight sidewall assembly which will confine the load is securing the panels to the posts properly. Some drivers use bolts and nuts to secure the panels to the posts. Others employ clamps such as C-clamps to achieve the desired attachment.

The use of such fasteners can cause difficulties in erection, particularly in inclement weather. A person's hands may become stiff and cold to a point that they lose their dexterity. When this occurs, an individual may find it difficult to position and tighten a C-clamp or insert a bolt through small openings in a panel and post and thread a nut onto the end of the bolt.

Another problem is the possibility of losing fasteners. If fasteners are lost, it may be difficult to find replacements at a loading station. Without such replacements, the side assembly may not have sufficient strength to support a large load on the flat bed. This could result in shifting of the load during transport and breaking through of the sidewalls with destruction or damage to the load as well as lost time in cleaning up the accident site. Thus, it is clear that none of the present side assemblies for flat beds provide trouble free operation in many situations.

The present invention provides a novel side assembly for flat bed trucks and trailers with advantages not found in previous side assemblies. The side assembly of the invention simplifies installation and removal. The side assembly provides an assembly with good structural integrity. The components of the side assembly can be stored conveniently when not in use.

The side assembly of the present invention can be installed or removed easily and quickly in a few minutes time. The installation can be accomplished even in very cold weather since the installer can wear heavy gloves and still be able to manipulate the various components during erection.

The side assembly of the invention is simple in design and relatively inexpensive. The side assembly can be manufactured from commercially available materials and components employing conventional wood and metal fabrication techniques and procedures. The side assembly requires little if any maintenance to keep it in good operating condition.

These and other benefits and advantages of the novel flat bed side assembly of the present invention will be apparent from the following description and the accompanying drawings in which:

FIG. 1 is a side view of one form of the side assembly of the invention mountd on a flat bed trailer;

FIG. 2 is an englarged fragmentary side view of the side assembly shown in FIG. 1;

FIG. 3 is a sectional view of the side assembly shown in FIG. 1 taken along line 3—3 thereof;

FIG. 4 is an enlarged view in perspective of a bracket member of the side assembly of the invention shown in FIGS. 1-3;

FIG. 5 is a sectional view of the bracket member of the side assembly shown in FIG. 2 taken along line 5—5 thereof; and FIGS. 6, 7 and 8 are sectional views of bracket members with different configurations.

As shown in the drawings, one form of the novel side assembly 11 of the present invention is mounted on a flat bed trailer 12 drawn by a tractor 13. The side assembly 11 includes a barrier portion 14, a socket portion 15, a support portion 16 and a holder portion 17.

The barrier portion 14 of the side assembly 11 includes a plurality of generally rectangular panels 20. The panels 20 are disposed generally vertically in an end to end relationship around the periphery of the flat bed 21 of the trailer 12.

The socket portion 15 of the side assembly 11 includes a plurality of pocket sections 22. The pocket sections 22 are arranged around the periphery of the flat bed 21. The pocket sections 22 are disposed adjacent the lower edges of the panels 20. Each of the pocket sections 22 extends downwardly from a plane through the flat bed 21.

The support portion 16 includes a plurality of elongated bar members 25. The bar members 25 have cross-sectional configurations substantially the same as those of the pocket sections 22. The bar members 25 may have a variety of different cross-sectional configurations. For example, as shown in FIGS. 5–8 rectangulr, triangular, trapezoidal, square or the like cross sections may be utilized.

Each bar member 25 has its lower end 26 disposed within one of the pocket sections 22. The lower end 26 of each bar member 25 may be tapered to provide a tight fit in the pocket section. The bar members 25 extend upwardly from the pocket sections 22 in a generally vertical direction. The bar members 25 preferably are hollow with closed upper ends.

The holder portion 17 of the side assembly 11 of the invention includes a plurality of bracket members 28. At least one bracket member 28 engages each of the bar members 25. Advantageously, two bracket members are disposed on each bar member, one adjacent the upper end and a second adjacent the lower end disposed within the pocket section.

Each bracket member 28 includes a plate section 29 and a strip secion 31. The strip section 31 has its ends affixed to the plate section 29. Advantageously, the ends of the strip section 31 may be welded to the plate section. The strip section 31 is bent into a configuration to provide an opening through the holder portion 17. The opening 32 has substantially the same cross-sectional configuration as that of the bar members 25 for separable engagement therewith.

The holder portion 17 also includes a hook member 33 extending from one end 34 of the plate section 29. The hook member 33 includes a connector section 36 and a projecting section 37. The connector section 36 extends substantially perpendicularly from a transverse edge 38 of the plate section 29. The connector section 36 extends from the plate section 29 a distance substantially equal to the thickness of the barrier panels 20.

Projecting section 37 of the hook member 33 extends from an edge 39 of the connector section remote from the plate section 29. The projecting section 37 extends from the connector section 36 in the same direction as the plate section 29 and substantially parallel to the plate section.

In the fabrication of the bracket member 28 of the side assembly 11 of the invention, steel plates may be bent to form the plate section 29, the connector section 36 and the projecting section 37 as an integral structure. Then, strip sections 31 are bent into the desired configurations similar to the cross section of the bar member 25 but slightly larger. For example, the strip section 31 can be bent to form three sides of a rectangle, a square, a trapezoid or two sides of a triangle or similar configuration.

The stip section 31 is oriented so the opening therethrough is perpendicular to the connector section 36. The strip section 31 preferably is positioned on the plate section 29 toward the end thereof remote from the connector section. Then, the ends of the strip section 31 are affixed to the plate section 29 such as by welding.

In the use of the side assembly 11 of the present invention, one end of each bar member 25 is placed into one of the pocket sections 22 arranged around the periphery of the flat bed 21 of trailer 12. When the desired number of bar members 25 have been positioned in the pocket sections, a barrier panel 20 is positioned against the bar members with one longitudinal edge of each panel resting on the flat bed 21 adjacent to the base of the bar members 25.

Holding the upper edge of the panel 20 against the top of a bar member 25, a bracket member 28 is slipped over the bar member with the hook member 33 thereof extending toward the interior of the flat bed. As the bracket member 28 is moved downwardly, the hook member 33 will slide over the upper edge of the panel 20 to hold the panel in place against the bar member. This sequence is repeated with each panel 20 and bar membe 25 around the periphery of the flat bed 21 until the bed i completely enclosed.

To fasten the panels 20 more securely and provide a side assembly 11 with greater rigidity and structural integrity, a second bracket member 28 may be employed with each bar member 25. In this situation, the second bracket member 28 is slipped over each bar member 25 before the panels are postioned.

The second bracket member is oriented so the hook member 33 is located toward the bottom of the bar member adjacent to the pocket section 22 as shown in FIGS. 1-3. Then, as each panel 20 is placed into position, the bottom edge of the panel is inserted into the hook member 33 of the second bracket member 28 located adjacent the pocket section 22. The upper edge of the panel is secured with the first bracket member 28 in the same way as described above. This arrangement provides top and bottom attachment of the panels and thus produces a side assembly with greater structural integrity.

The above description and the accompanying drawings show that the present invention provides a novel side assembly for flat bed trucks and trailers. The side assembly of the invention can be installed or removed from a flat bed truck or trailer quickly and easily.

The side assembly of the invention can be installed on a flat bed truck or trailer by a driver or a workman without special tools after a minimum of instruction. The components of the side assembly can be stored conveniently. The side assembly can be adapted to a variety of different truck or trailer bodies.

The side assembly of the present invention is simple in design and is relatively inexpensive. The side assembly can be fabricated from commercially available materials and components. The side assembly can be manufactured employing conventional metal and wood working techniques and procedures. The side assembly is durable in construction and has a long useful life. Little if any maintenance is required to keep the side assembly in good working condition.

It wil be apparent that various modifications can be made in the particular side assembly described in detail above and shown in the drawings within th scope of the invention. The size, configuration and arrangement of components can be changed to meet specific requirements. Also, the panels can include a variety of different barrier sections. In addition, the bracket members can be fabricated of materials other than steel, such as high strength molded pastics and the like. These and other changes can be made in the side assembly provided the functioning and operation thereof are not adversely affected. Therefore, the scope of the invention is to be limited only by the following claims.

What is claimed is:

1. A removable side assembly for a flat bed of a truck or traileer, said side assembly including a barrier portion, a socket portion, a support portion and a holder portion; said barrier portion including a plurality of generally rectangular panels, said panels being disposed generally vertically in an end to end relationship around the periphery of said flat bed; said socket portion including a plurality of pocket sections, said pocket sections being arranged around the periphery of said flat bed adjacent the lower edges of said panels, each of said pocket sections extending downwardly from a plane through said flat bed; said support portion including a plurality of elongated bar members having cross-sectional configurations substantially the same as those of said pocket sections, each bar member having its lower end disposed within one of said pocket sections, said bar members extending upwardly from said pocket sections genrally vertically; said holder portion including a plurality of bracket members with at least one bracket member engaging each of said bar members, each bracket member including a plate section, a strip section having its ends affixed to said plate section and being bent into a configuration to provide an opening having substantially the same cross-sectional configuration as that of said bar members for separable engagement therewith, a hook member extending from one end of said plate section, said hook member including a connector section extending substantially perpendicularly from a transverse edge of said plate section, said connector section extending from said plate section a distance substantially equal to the thickness of a barrier panel, a projecting section extending from an edge of said connector section remote from said plate section, said projecting section extending from said connector section in the same direction as said plate section and substantially parallel thereto; whereby said barrier panels are positioned against said bar members with the lower edges thereof resting on said flat bed and the upper edges of said barrier panels being retained between said plate section, said connector section and said projecting section of said holder portions to provide a continuous side assembly around the periphery of said flat bed.

2. A removable side assembly for a flat bed of a truck or trailer according to claim 1 wherein a second bracket member is disposed on each bar member adjacent said pocket section.

3. A removable side assembly for a flat bed of a truck or trailer according to claim 2 wherein said hook member of the first mentioned bracket member extends downwardly and said hook member of said second bracket member extends upwardly.

4. A removable side assembly for a flat bed of a truck or trailer according to claim 1 wherein said strip section is oriented so an opening therethrough is substantially perpendicular to said connector section.

5. A removable side assembly for a flat bed of a truck or trailer according to claim 1 wherein said strip section is positioned on said plate section toward the end thereof remote from said connector section.

6. A removable side assembly for a flat bed of a truck or trailer according to claim 1 wherein said ends of said strip section are welded to said plate section.

7. A removable side assembly for a flat bed of a truck or trailer according to claim 1 wherein said plate section, said connector section and said projecting section of said holder portion are formed as an integral structure.

8. A removable side assembly for a flat bed of a truck or trailer according to claim 1 wherein said pocket sections, said bar members and said bracket members have a rectangular, triangular, trapezoidal or square cross-sectional configuration.

9. A removable side assembly for a flat bed of a truck or trailer according to claim 1 wherein said barrier panels are plywood sheets.

10. A removable side assembly for a flat bed of a truck or trailer according to claim 1 wherein said bar members are hollow with closed upper ends.

11. A removable side assembly for a flat bed of a truck or trailer according to claim 1 wherein said lower ends of said bar members are tapered.

* * * * *